United States Patent
Wolff

(10) Patent No.: US 11,102,018 B1
(45) Date of Patent: Aug. 24, 2021

(54) POWERED COMMUNICATION DEVICE

(71) Applicant: ALE INTERNATIONAL, Colombes (FR)

(72) Inventor: Christophe Wolff, Benfeld (FR)

(73) Assignee: ALE INTERNATIONAL, Colombes (FR)

( * ) Notice: Subject to any disclaimer, the term of this patent is extended or adjusted under 35 U.S.C. 154(b) by 467 days.

(21) Appl. No.: 16/322,659

(22) PCT Filed: Jan. 16, 2017

(86) PCT No.: PCT/IB2017/050224
§ 371 (c)(1),
(2) Date: Feb. 1, 2019

(87) PCT Pub. No.: WO2018/109567
PCT Pub. Date: Jun. 21, 2018

(30) Foreign Application Priority Data

Dec. 12, 2016 (EP) ..................................... 16306665

(51) Int. Cl.
*H04L 12/10* (2006.01)
*H04L 12/40* (2006.01)
(Continued)

(52) U.S. Cl.
CPC .............. *H04L 12/10* (2013.01); *G06F 1/266* (2013.01); *H04L 12/40045* (2013.01); *H04B 3/54* (2013.01)

(58) Field of Classification Search
CPC . H04B 3/54; H04B 3/542; H04B 3/56; H04B 3/544; H04B 2203/5425
(Continued)

(56) References Cited

U.S. PATENT DOCUMENTS 8,158,883 B2   4/2012  Soffer
2006/0057967 A1   3/2006  Shimada
(Continued)

OTHER PUBLICATIONS

International Search Report with regard to PCT/IB2017/050224 dated May 1, 2017.
(Continued)

*Primary Examiner* — Shuwang Liu
*Assistant Examiner* — Gina M McKie
(74) *Attorney, Agent, or Firm* — BCF LLP

(57) ABSTRACT

A powered communication device (31) comprises: a configurable resistor unit (35) coupled to the LAN port and adapted to generate a classification signal designating a power class of the powered communication device to be detected by the LAN switch, and a power module comprising a power converter (38) adapted to supply power to the electronic control unit (40) and to the peripherals in response to receiving power from the LAN port, wherein the electronic control unit (40) is configured to determine a power requirement of the communication device, detect a current resistance state of the configurable resistor unit (35) and, in response to detecting that the power requirement overshoots a power class associated to the current resistance state of the configurable resistor unit: reconfigure the configurable resistor unit (35) to designate a higher power class and, actuate the power switch (37) to transitorily put the LAN port (33) in a low-current state to be detected by the LAN switch.

18 Claims, 5 Drawing Sheets

(51) Int. Cl.
*G06F 1/26* (2006.01)
*H04B 3/54* (2006.01)

(58) Field of Classification Search
USPC .......................................................... 375/257
See application file for complete search history.

(56) References Cited

U.S. PATENT DOCUMENTS

| | | |
|---|---|---|
| 2006/0112288 A1 | 5/2006 | Schindler |
| 2006/0214253 A1* | 9/2006 | Camagna ................ G06F 1/266 |
| | | 257/499 |
| 2006/0218422 A1 | 9/2006 | Camagna et al. |
| 2007/0189495 A1 | 8/2007 | Crawley et al. |
| 2007/0220280 A1 | 9/2007 | Karam et al. |
| 2008/0164884 A1 | 7/2008 | Hussain et al. |
| 2009/0031151 A1 | 1/2009 | Masuda et al. |
| 2009/0041004 A1 | 2/2009 | Emmanuel |
| 2010/0164389 A1 | 7/2010 | Dellian et al. |
| 2012/0131372 A1* | 5/2012 | Hibi ....................... H04L 12/10 |
| | | 713/340 |
| 2015/0130269 A1 | 5/2015 | Barrass et al. |
| 2015/0372826 A1 | 12/2015 | Blaut et al. |

OTHER PUBLICATIONS

International Preliminary Report on Patentability with regard to PCT/IB2017/050224 completed Dec. 6, 2018.
European Search Report with regard to EP Patent Application No. 17880661.8 completed Jan. 9, 2020.

* cited by examiner

DELAY 2 > DELAY 1

POWERED COMMUNICATION DEVICE

FIELD OF THE INVENTION

The invention relates to the technical field of communication systems and powered communication devices employed in such systems, in particular to communication systems compliant with Power-over-Ethernet (PoE) standards.

BACKGROUND

When a communication terminal such as an IP telephone is powered through PoE, it presents a hardware signature at start-up, which designates the power class level among three possible levels. If the hardware signature is statically defined to designate a power class level corresponding to a maximum power requirement of the IP phone, the requested power is very frequently going to be much higher than the real power need, because peripherals and/or optional hardware accessories are not employed by all users and/or are not used at all times. This has a drawback that the total power budget of the PoE switch may be reached before all ports are connected. This means that any additional device to be connected to the PoE switch will need an independent power supply.

US-A-2009 031151 discloses a communication terminal, which receives power via a communication cable from a power sourcing device and which is configured to connect an option unit. The communication terminal comprises a resistor unit which is disposed on a power sourcing line from the communication cable and configured to vary a resistor value, a control unit which recognizes a class of the communication terminal itself and sets a resistor value in order to achieve response characteristics corresponding to the recognized class, and a storing unit which stores the set resistor value.

While such solution avoids the drawbacks of a static power class definition, it entails discomfort for the user who has to disconnect and reconnect the LAN cable to the communication terminal every time a power requirement of the communication terminal is modified.

SUMMARY

Aspects of the invention are based on the idea of providing a communication terminal which makes it possible to re-configure the hardware signature and trigger detection of the new signature check without requesting the user to unplug and plug the device. Aspects of the invention are based on the idea of providing such a communication terminal in a robust and cost-efficient implementation.

In an embodiment, the invention provides a powered communication device comprising:
a LAN port adapted for coupling a LAN switch and for receiving data and power from the LAN switch,
a configurable resistor unit coupled to the LAN port and adapted to generate a classification signal designating a power class of the powered communication device to be detected by the LAN switch, wherein the power class is associated to a resistance state of the configurable resistor unit,
an electronic control unit and peripherals coupled to the electronic control unit, and a power module comprising a power converter adapted to supply power to the electronic control unit and to the peripherals in response to receiving power from the LAN port, wherein the power module further comprises a power switch configured to selectively couple the power converter to the LAN port,
wherein the electronic control unit is configured to determine a power requirement of the communication device, detect a current resistance state of the configurable resistor unit and, in response to detecting that the power requirement overshoots a power class associated to the current resistance state of the configurable resistor unit:
reconfigure the configurable resistor unit to designate a higher power class and,
actuate the power switch to transitorily put the LAN port in a low-current state to be detected by the LAN switch.

The low-current state means a state in which the electrical power drawn from the LAN switch is zero or so low that the LAN port is considered disconnected.

According to embodiments, such powered communication devices can comprise one or more of the features below.

In embodiments the powered communication device further comprises a power port adapted for coupling a power adapter and for receiving power from the power adapter, wherein the power switch comprises a first switching state for powering the power converter from the LAN port and a second switching state for powering the power converter from the power port,
wherein the electronic control unit causes the LAN port to be put in a low-current state by sending a trigger signal to force the power switch in the second switching state.

In an embodiment, the power module further comprises a power switch controller adapted to control the power switch, wherein to the power switch controller is configured to force the power switch in the second switching state in response to receiving the trigger signal from the electronic control unit.

In an embodiment, the power switch controller is further configured to force the power switch in the second switching state in response to detecting power on the power port.

In an embodiment, the powered communication device further comprises a sequence control module having an input coupled to the electronic control unit, a first output coupled to the configurable resistor unit and a second output coupled to the power switch, wherein the electronic control unit is configured to send a trigger signal to the input of the sequence control module in response to detecting that the power requirement overshoots a power class associated to the current resistance state of the configurable resistor unit wherein the sequence control module comprises a first delay line arranged between the input and the first output and a second delay line arranged between the input and the second output, so that the trigger signal received by the input is transmitted to the configurable resistor unit with a first delay to cause reconfiguration of the configurable resistor unit and to the power switch with a second delay to cause the LAN port to be transitorily put in the low-current state, wherein the second delay is longer than the first delay.

In an embodiment, the second delay line comprises a capacitor adapted to store energy for maintaining the second output in an energized state after the powered communication device has been powered off.

In an embodiment, said input of the sequence control module is a first input and the sequence control module further comprises a second input connected to the capacitor independently from the first input, wherein the electronic control unit is adapted to send a trigger signal to the second input.

In an embodiment, the electronic control unit further comprises a non-volatile memory for storing logical identification of a current power class of the powered communication device, wherein the electronic control unit is configured to send the trigger signal to the second input in response to determining that the current power class is higher than a default power class.

In embodiments the powered communication device further comprises a power port adapted for coupling a power adapter and for receiving power from the power adapter, wherein the power switch comprises a first switching state for powering the power converter from the LAN port and a second switching state for powering the power converter from the power port,
wherein the power module further comprises a power switch controller adapted to control the power switch, wherein the second output of the sequence control module is coupled to the power switch controller, wherein to the power switch controller is configured to force the power switch in the second switching state in response to receiving the trigger signal from the sequence control module.

In embodiments the powered communication device further comprises a USB host adapted to carry out a USB enumeration and configuration process, wherein the electronic control unit is configured to determine a power requirement of the communication device as a function of a peripheral power requirement detected during the USB enumeration and configuration process.

The invention also provides a communication system comprising a powered communication device and a LAN switch having a LAN port adapted for supplying data and power to the LAN port of the powered communication device, wherein the LAN switch is configured to:
detect the powered communication device upon connection of the LAN port of the LAN switch to the LAN port of the powered communication device,
determining a power class of the powered communication device as a function of the classification signal generated by the powered communication device,
supplying power of a quantity based on the power class of the powered communication device.

In embodiments, the classification signal generated by the powered communication device is a classification current signal, which may be generated passively by the powered communication device by presenting a predefined electric resistance on the line while the LAN switch is applying predefined voltage. The classification current signal is sensed by the LAN switch to determine the power class of the powered communication device.

In embodiments the powered communication device and/or the LAN switch is compliant with an IEEE 802.3af or IEEE 802.3at standard.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
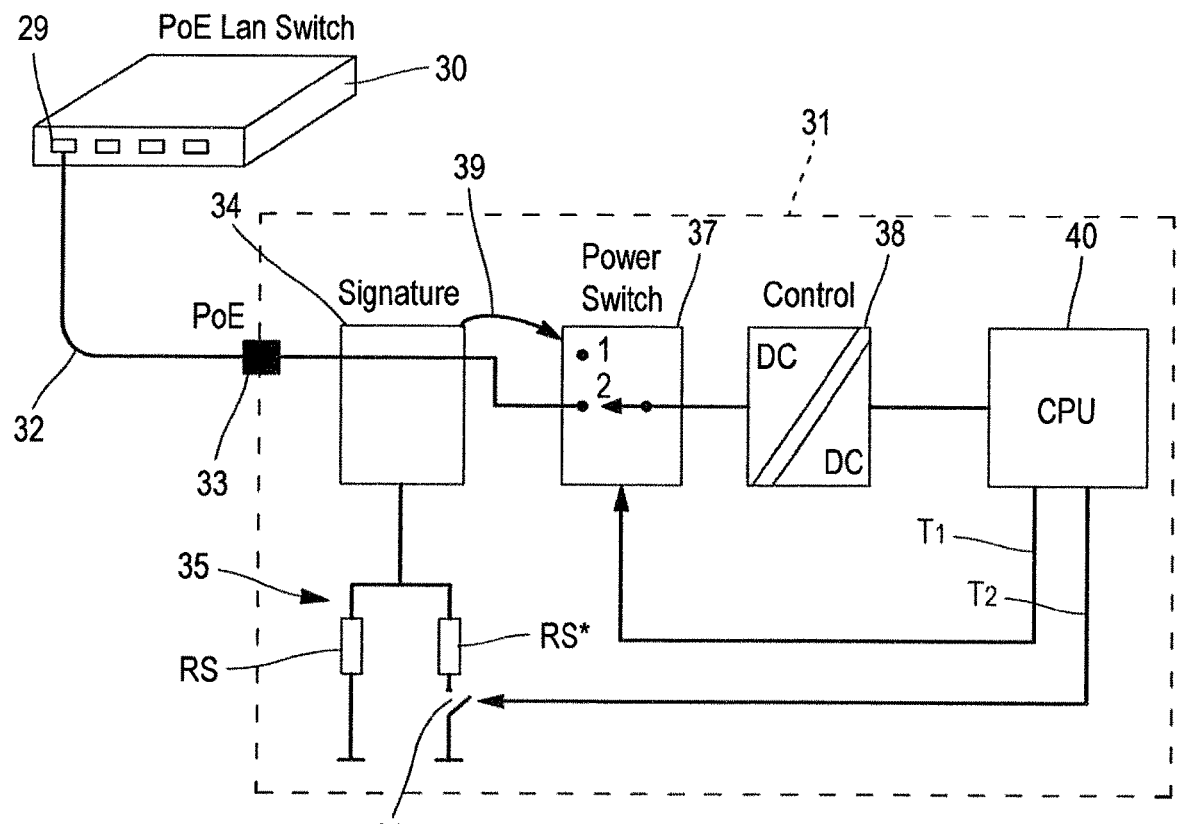
FIG. 1 is a diagrammatic representation of a communication system comprising a powered communication device in accordance with a first embodiment of the invention.

Power over Ethernet (PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and further additions. The IEEE 802.3af standard is a globally applicable standard for combining the transmission of Ethernet packets with the transmission of DC-based power over the same set of wires in a single Ethernet cable. PoE can be employed to power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. As the standard evolves, additional power has also become available. Conventional 8-conductor type RJ-45 connectors (male or female, as appropriate) are typically used on both ends of all Ethernet connections. They are wired as defined in the IEEE 802.3af standard. Two conductors wiring such as shielded or unshielded twisted pair wiring (or coaxial cable or other conventional network cabling) may be used so each transmitter and receiver has a pair of conductors associated with it.

In order to provide regular inline power to a PD from a PSE it is a general requirement that two processes first be accomplished. First, a "discovery" process must be accomplished to verify that the candidate PD is, in fact, adapted to receive inline power. The discovery process is therefore used in order to avoid providing inline power (at full voltage of −48 VDC) to so-called "legacy" devices which are not particularly adapted to receive or utilize inline power.

Second, a "classification" process must be accomplished to determine an amount of inline power to allocate to the PD, the PSE having a finite amount of inline power resources available for allocation to coupled PDs. The classification process involves applying a voltage in a classification range to the PD. The PD may use a current source to send a predetermined classification current signal back to the PSE. This classification current signal corresponds to the "class" of the PD. The classification process is therefore used in order to manage inline power resources so that available power resources can be efficiently allocated and utilized. The classification process may be carried in one or more steps, e.g. two steps in the IEEE 802.3at standard.

Embodiments of PDs which can conveniently switch from one power class to another will now be described.

With reference to FIG. 1, the PSE is a LAN switch 30 and the PD is a communication device 31, e.g. IP telephone or other connected to the LAN switch 30 by Ethernet cable 32 coupled to respective PoE ports 29, 33 of the LAN switch 30 and communication device 31.

Connected to the PoE port 33 of communication device 31 is a signature circuit 34 comprising a configurable resistor unit 35 may be configured in any one of a plurality of a resistance states to modify the power class of the IP telephone 1 in the classification process. In the example shown, the configurable resistor unit 35 consists of a first resistor Rs corresponding to a default power class of the communication device 31 and a second resistor Rs* mounted in parallel to first resistor Rs and selectively connectable to signature circuit 34 through a switch 36. When switch 36 is closed, the equivalent resistance of resistor unit 35 is diminished so as to correspond to a higher power class. For the sake of illustration, the values of Rs and Rs* may be selected to match class 1 of the standard as the default power class and class 3 as the higher power class.

Arranged between signature circuit 34 and control unit 40 are a power switch 37 and a voltage converter 38. The power switch 37 defaults to an open state when the communication device 31 is disconnected from Ethernet cable 32, so that the control unit 40 is not directly vulnerable to any excessive voltage or intensity that may be erroneously applied to PoE port 33. At the end of the classification process, the signature circuit 34 operates to close power switch 37 as indicated by arrow 39, so that the control unit 40 gets power from the LAN switch 30. Voltage converter 38 operates to convert the 48V DC voltage of PoE into suitable voltage for the communication device hardware, e.g. 5V DC.

The operations of communication device 31 will now be described.

It is assumed that switch 36 is initially open. Therefore, when the communication device 31 is plugged to the LAN switch 30, the resistance signature which is sensed by the LAN switch 30 corresponds to first resistor Rs and the default power class is allocated. The communication device 31 is now powered and starts running.

While communication device 31 is running, control unit 40 operates to determine a power requirement of the communication device, i.e. how much electrical power is needed to operate communication device 31 and all its peripherals being powered through communication device 31. Such determination may be carried out periodically or upon detection of specific events, e.g. a USB enumeration process. When control unit 40 detects that the power requirement is going to overshoot the power class currently allocated, it triggers two actions:

Send trigger signal T2 to switch in order to reconfigure the configurable resistor unit 35 so as to change the resistance signature and designate the higher power class and, Send trigger signal T1 to power switch 37 to open the power switch 37.

By opening power switch 37, control unit 40 causes the communication device 31 to shut down, so that power consumption will drop to zero (i.e. below the minimum hold current defined by the PoE standards) and the LAN switch 30 will be able to detect a low-current state of the corresponding LAN port 29.

By virtue of its normal operations in accordance with PoE, the LAN switch 30 will soon start again the discovery and classification processes. This time, the higher power class will be allocated because the signature resistance has changed through the closing of switch 36. It is assumed that switch 36 is a steady-state switch that remains in the closed state throughout the powering off and re-start of communication device 31. After restart, the power budget of communication device 31 has increased and has become sufficient to power up an additional peripheral or service. It must be noted that the power class upgrade may take place without any human intervention.

The above mentioned power class upgrade process requires that the control unit 40 is able to determine the power class currently allocated. This requirement may be fulfilled in different ways. A simple option consists of status information stored in a non-volatile memory of the control unit 40 and updated by the control unit 40 each time a change is made to the configurable resistor unit 35, so that the status information always reflects the current resistance state of configurable resistor unit 35.

For that purpose a 1-bit logical flag is suitable for the two-state configurable resistor unit 35 of FIG. 1, e.g. with value "0" associated to the open state of switch 36 and value "1" associated to the closed state of switch 36.

Figure 2:
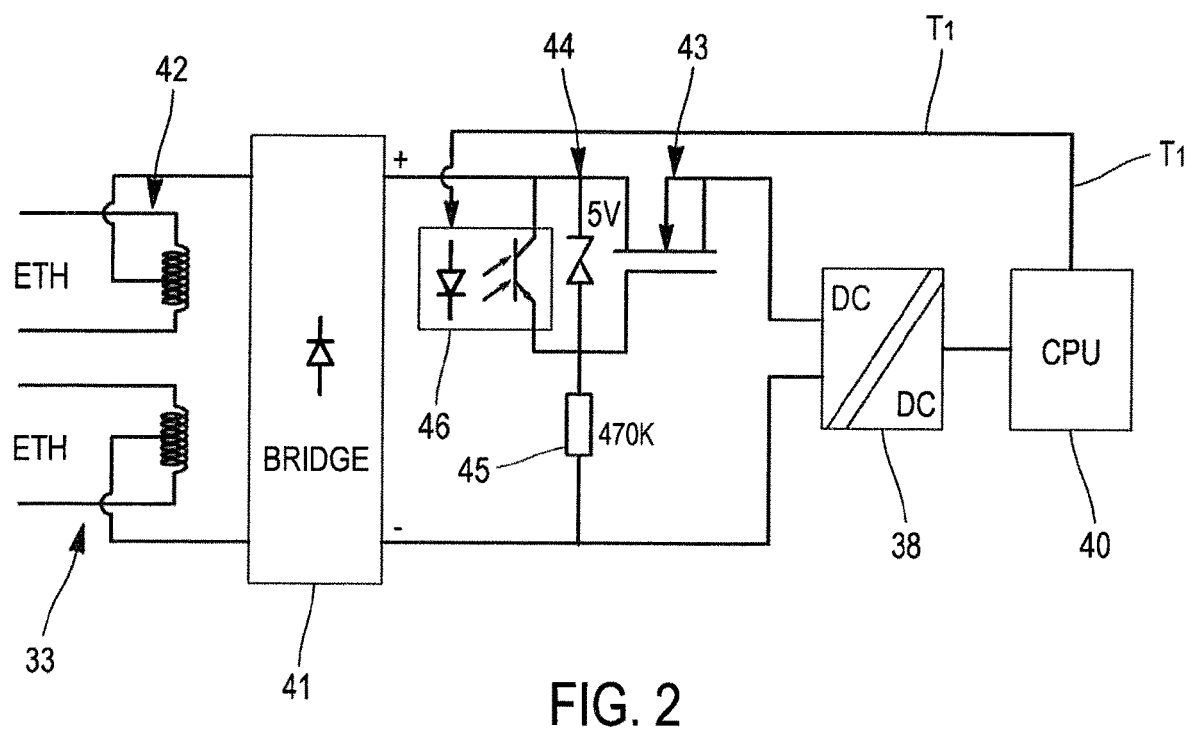
FIG. 2 is a diagrammatic representation of a circuit which may be employed in the powered communication device of FIG. 1.

FIG. 2 depicts an embodiment of the power switch 37 and PoE port 33. The left-hand side shows the usual center tapped transformer arrangements 43 of the Ethernet port. The diode bridge 41 serves to provide a definite polarity from input signals which may be polarized in different manners. The power switch itself comprise a MOSFET 43 which defaults to a conductive state thanks to the negative gate potential applied by Zener diode 44, itself polarized by resistor 45. The MOSFET 43 will cut off the line in response to trigger signal T1 which feeds optocoupler 46, thus bypassing Zener diode 44.

Figure 3:
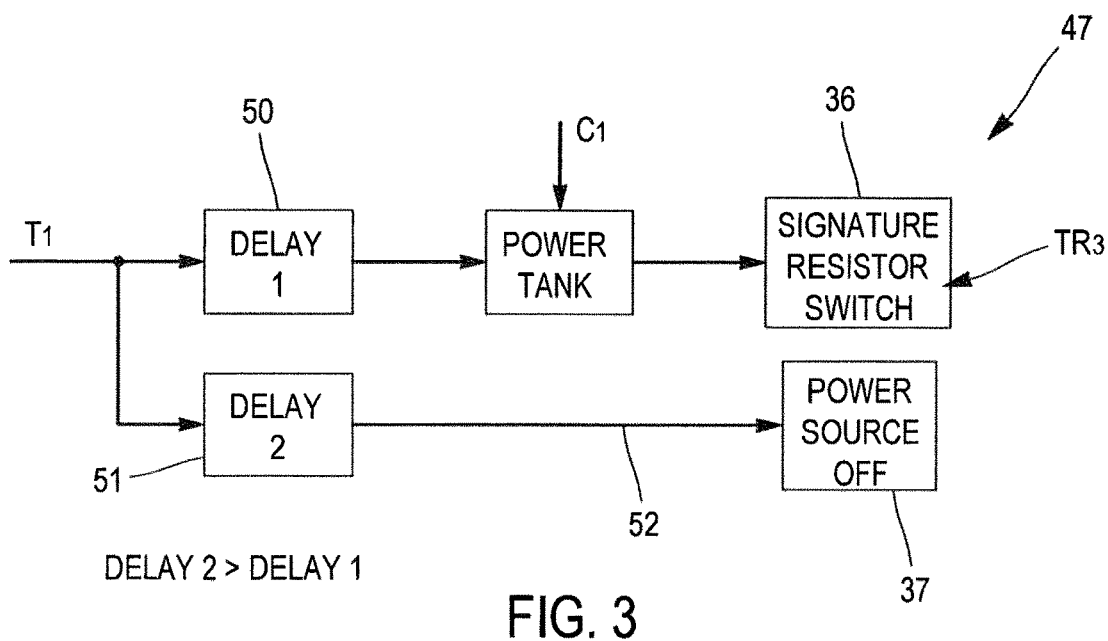
FIG. 3 is a functional representation of a sequence control module which may be employed in the powered communication device.
Figure 4:
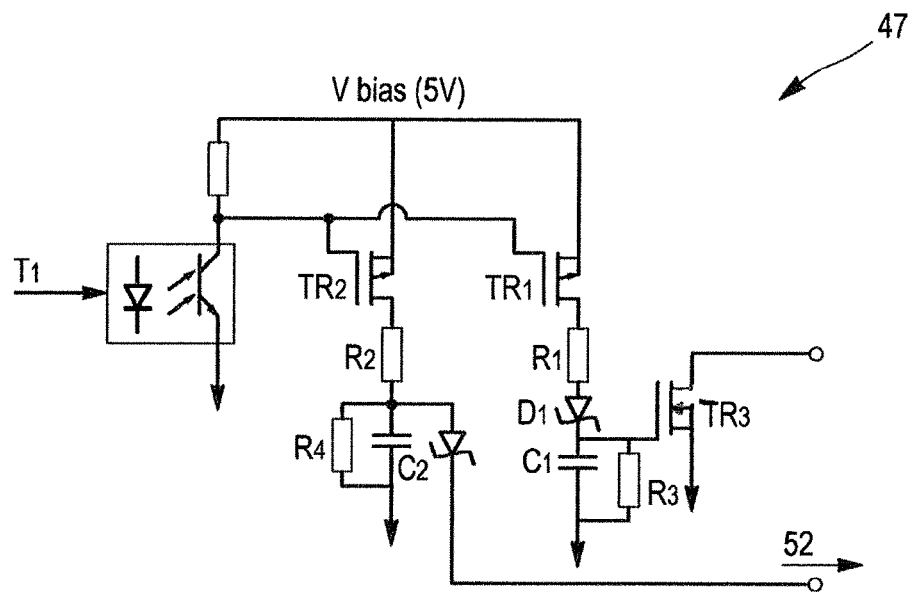
FIG. 4 is a diagrammatic representation of a circuit implementing the sequence control module of FIG. 3.

While the embodiment of FIG. 1 requires control unit 40 to send two successive trigger signals T2 and T1, FIGS. 3 and 4 illustrate a sequence control module 47 which makes it possible to use a single trigger signal T1 from control unit 40 to actuate both the configurable resistor unit 35 and the power switch 37 in sequence. FIG. 3 shows a functional view of the module 47 and FIG. 4 shows a physical implementation. Namely, transistor TR1, resistor R1 and capacitor C1 make up a first delay module 50 that will switch transistor TR3 after a first delay. Similarly, transistor TR2, resistor R2 and capacitor C2 make up a second delay module 51 that will generate a trigger signal 52 to actuate the power switch 37 after a second delay longer than the first delay.

With this circuit, the switch 36 is implemented by transistor TR3, which is not a steady-state switch that could hold a given state indefinitely. For that reason, capacitor C1 is designed with a capacity adapted to sustain the conductive state of transistor TR3 for a certain time after power switch 37 has shut down the communication device 31, namely enough time for the discovery and classification processes to take place again and the higher power class to be allocated, e.g. from 2 to 10 minutes. In other words, capacitor C1 operates as a power tank for transistor TR3. This embodiment is much more cost-effective than using a mechanical, steady-state switch to implement switch 36.

When the switch 36 is not a steady-state switch, i.e. defaults to the open state when powered off for a certain time, it is necessary to update the status information in the same manner. This may be obtained by storing the logical flag in a non-volatile memory in association with an absolute timestamp generated by an internal clock of the communication device 31. The timestamp is generated at the time of updating the logical flag. Pre-defined time-out duration is stored in memory. When the control unit 40 reads the value of the logical flag at start-up, the control unit 40 compares the time elapsed between the present instant and the timestamp associated to the logical flag. If the elapsed time is longer than the pre-defined time-out duration, the control unit 40 resets the logical flag and proceeds to have the communication device 31 start in the default power class.

Alternatively, the logical flag may be stored in a volatile memory, which will also default to the value "0" when powered off for a certain time.

Figure 5:
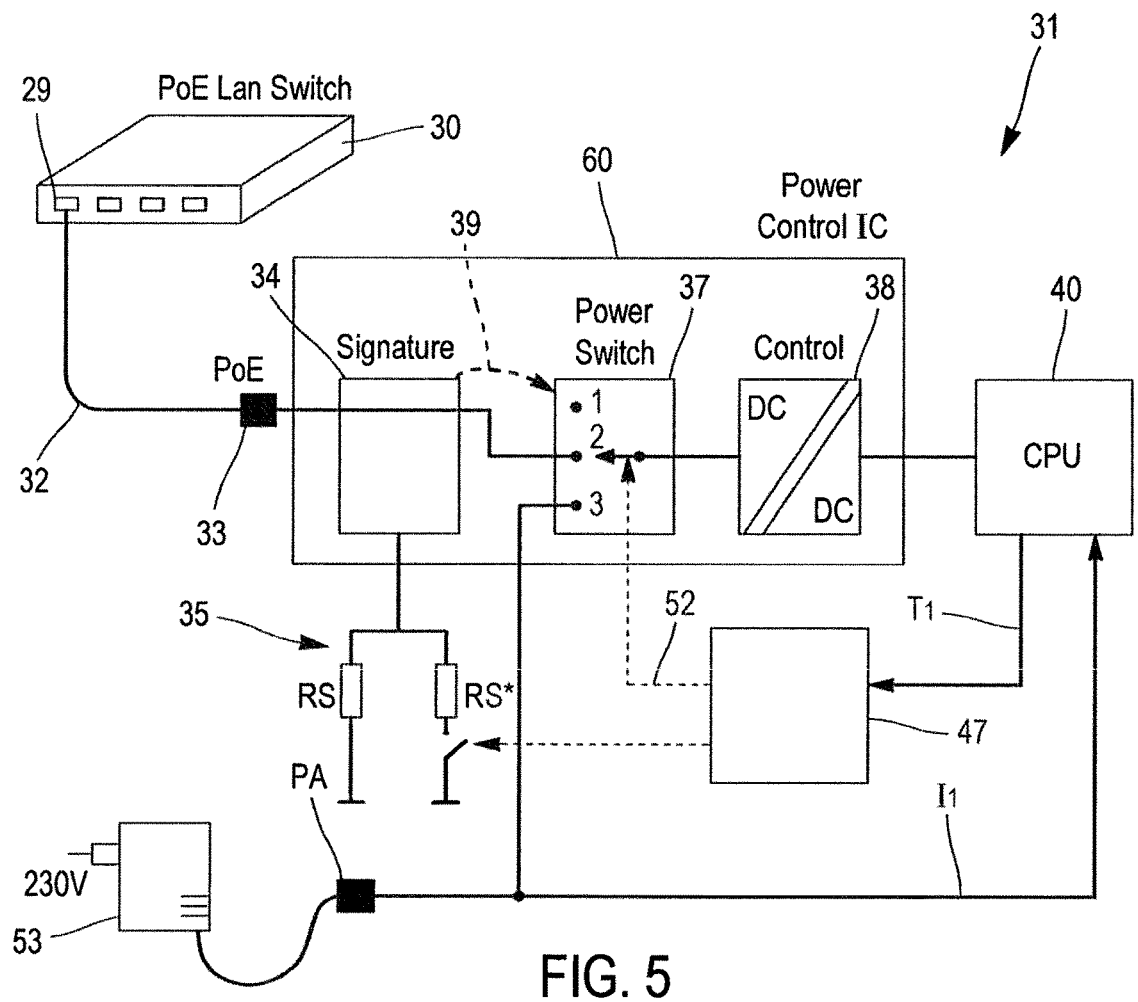
FIG. 5 is a diagrammatic representation of a communication system comprising a powered communication device in accordance with a second embodiment of the invention.

FIG. 5 illustrates a modified embodiment of the communication device 31, in which the sequence control module 47 is employed. Elements identical or similar to those of FIG. 1 are designated by the same numeral.

In FIG. 5, a modified embodiment of the power switch 37 is employed. Namely power switch 37 comprises an additional switching state (marked by numeral 3) to operate the communication device 31 with a power adapter 53. A suitable power control integrated circuit 60 that comprises the power switch 37 is available from Texas Instruments under the reference TPS23753. A power adapter port PA is provided on the communication device 31. Through an input line I1, the power control integrated circuit 60 may detect that power is fed to power adapter port PA. Power control integrated circuit 60 operates to configure the power switch 37 in the additional switching state in response to such detection. Power over Ethernet is not active in such case. Conversely, the additional switching state of power switch 37 is not employed when no power is fed to power adapter port PA.

However, in the embodiment of FIG. 5, the sequence control module 47 is configured to simulate the presence of a power adapter 53, e.g. by sending the trigger signal 52 to the APD port of the TPS23753 card. When this happens, because there is indeed no power source connected to power adapter port PA, the power switch 37 is caused to cut off the line as if it was place in an open state. In other words, the sequence control module 47 tricks the power switch 37 into reacting as if a power adapter was plugged, although there is none, so as to cause the communication device 31 to restart.

Figure 6:
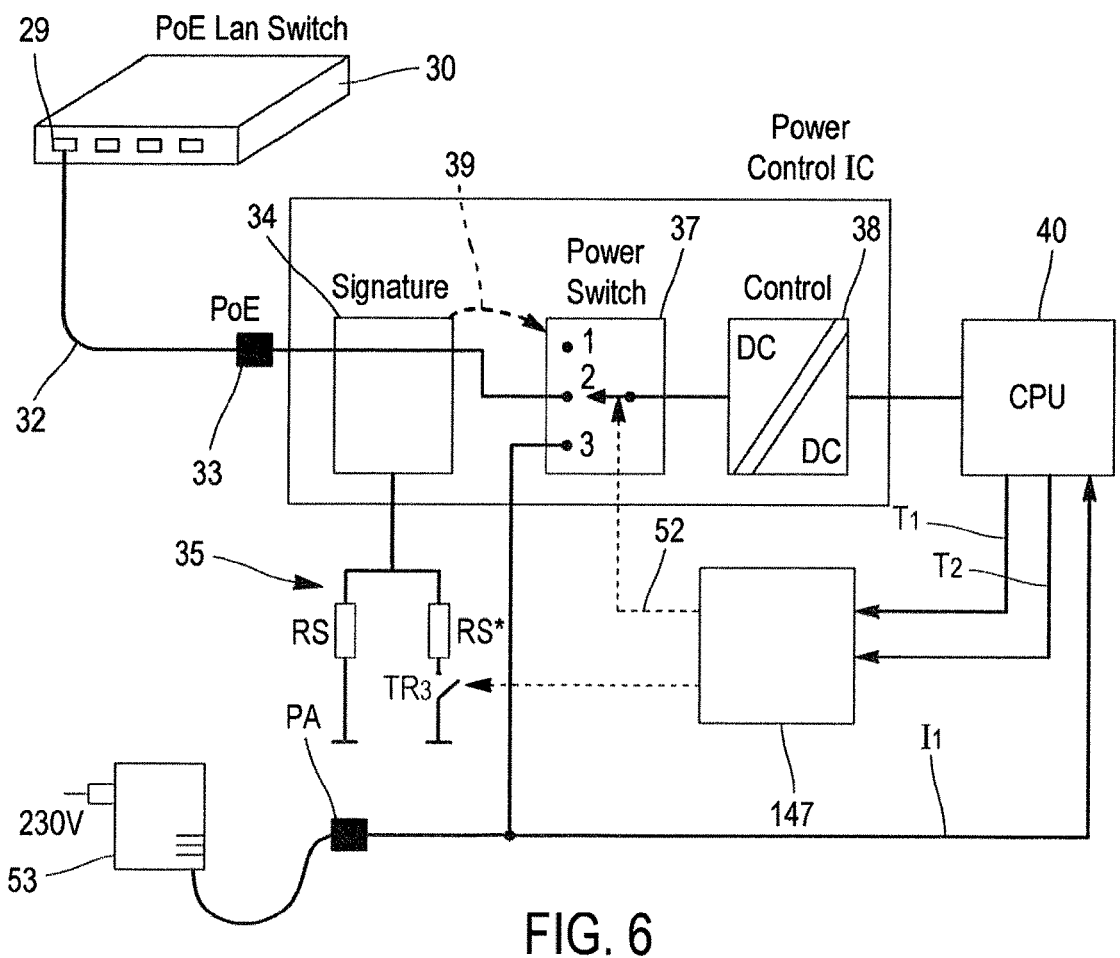
FIG. 6 is a diagrammatic representation of a communication system comprising a powered communication device in accordance with a third embodiment of the invention.
Figure 7:
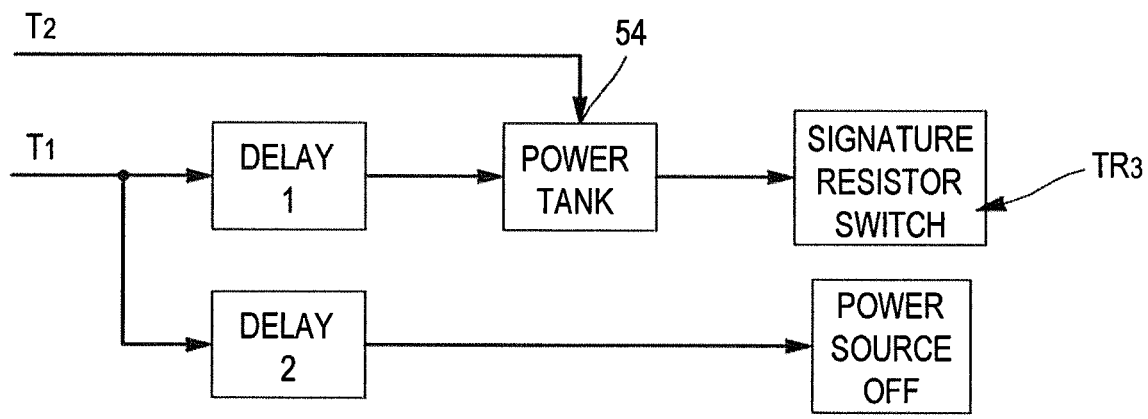
FIG. 7 is a functional representation of a sequence control module which may be employed in the powered communication device of FIG. 6.
Figure 8:
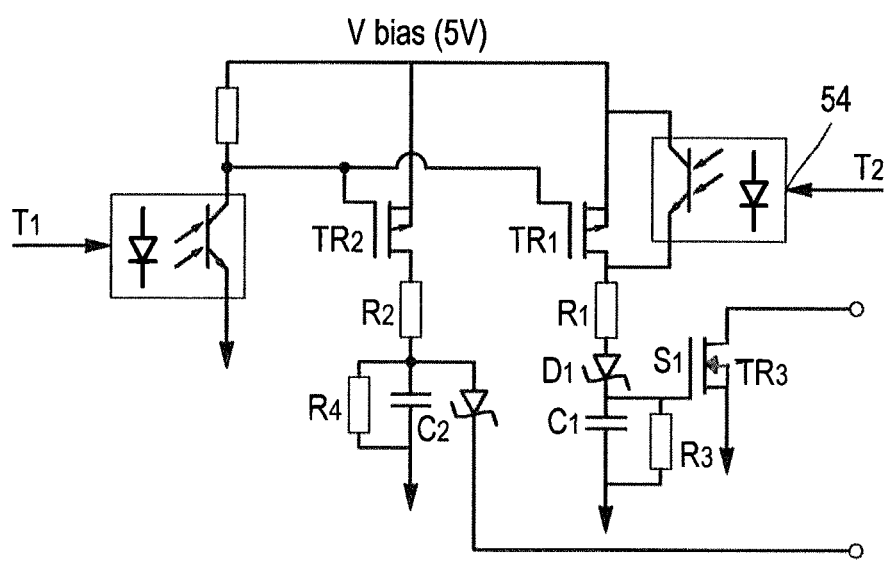
FIG. 8 is a diagrammatic representation of a circuit implementing the sequence control module of FIG. 7.

Turning to FIGS. 6 to 8, a modified embodiment of the sequence control module 147 will now be described. In the embodiment of FIG. 4, it will be appreciated that the capacitor C1 will become charged only in response to the trigger signal T1, i.e. only if the restart is generated by control unit 40 as a result of processes described above. Conversely, if the communication device 31 has been operating in the higher power class for sufficient time for the capacitor C1 to be discharged and becomes suddenly disconnected through a manual intervention of the user, e.g. temporarily unplugging the LAN cable, and is restarted, the communication device 31 will not be able to restart directly in the higher power class: it will rather restart in the default power class and go through the whole power class enhancement process again. The modified embodiment of the sequence control module 147 avoids this. Namely, the transistor TR1 is provided with an independent feed port 54. By sending a trigger signal T2 to feed port 54, the control unit 40 may maintain the charge of capacitor C1 and therefore keep the switch 36 closed (transistor TR3) without interacting with the power switch 37.

FIG. 6 shows the communication device 31 with the modified sequence control module 147. The communication device 31 operates as follows:

When the power class becomes upgraded above the default power class by virtue of the above-described processes the control unit 40 stores corresponding information in a memory. The corresponding information may be a logical flag (Boolean) which means higher-than-default-power-class. As long as that logical Flag is activated, the control unit 40 keeps the capacitor C1 energized through trigger signal T2, so that switch 36 remains closed. With this embodiment, the communication device 31 is able to restart directly in the higher power class in case of an inadvertent disconnection.

While the above embodiments have been described with a configurable resistor unit 35 having only two different resistance states, it must be appreciated that the above described processes for updating a power class of the device are applicable with configurable resistor units having any number of selectable resistance states to designate any number of different power classes. More bits must be allocated to the status information in such case.

Figure 9:
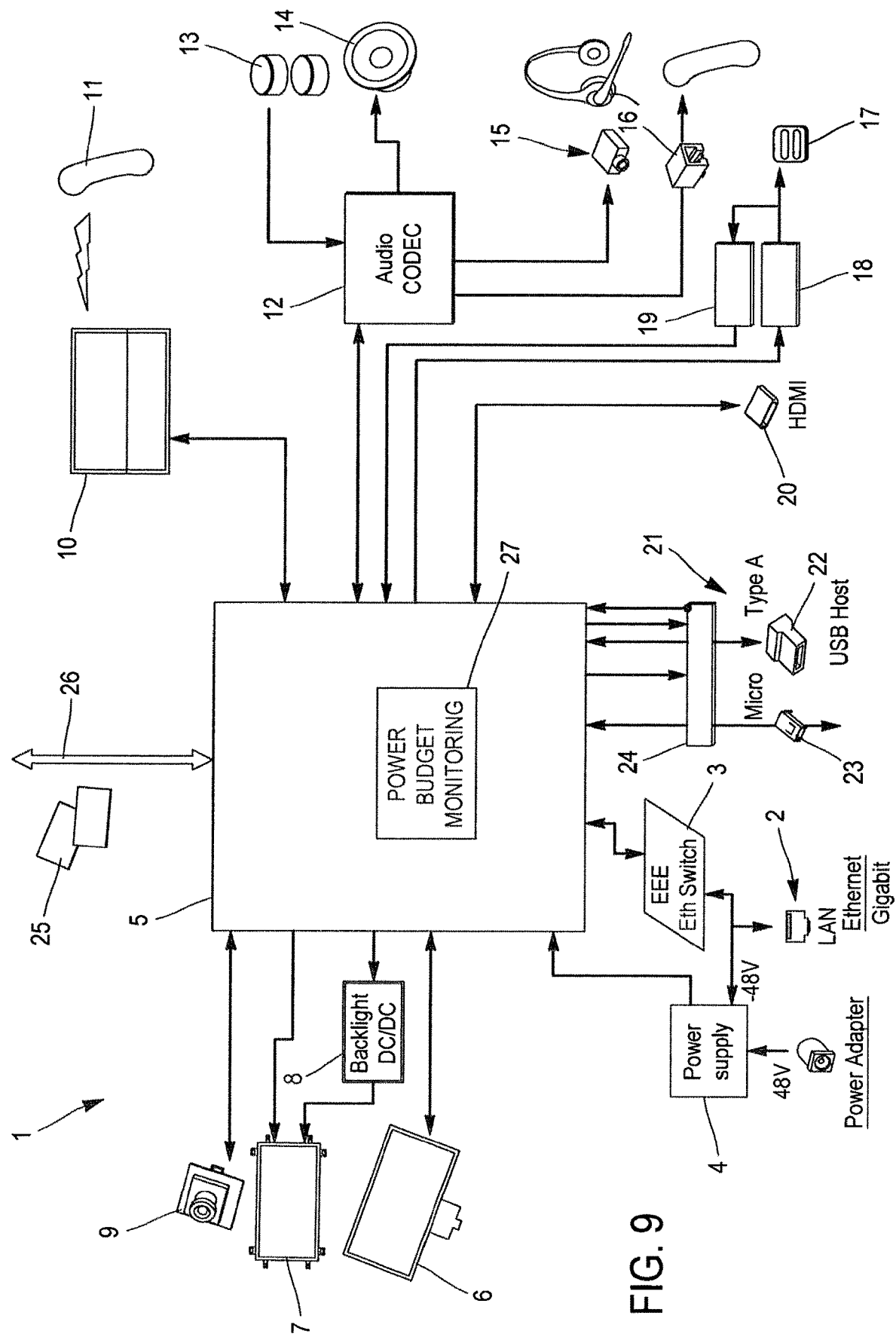
FIG. 9 is a functional representation of an IP phone in which embodiments of the invention may be implemented.

FIG. 9 schematically depicts an IP telephone 1 which can be powered using PoE. For that purpose the IP phone includes a LAN port 2 suitable for receiving a LAN cable, e.g. with conventional RJ-45 connectors. The LAN port 2 is connected to both an Ethernet switch 3 for switching the Ethernet data packets and a power supply module 4 for providing electrical power to further components of the IP telephone 1, i.e. a central processing unit (CPU) 5 and peripherals of all sorts.

For the sake of illustration, the peripherals may include one or more of the following: capacitive touch panel 6, LCD screen 7 with backlight 8, video camera 9, radio connectivity module 10 for interfacing a wireless peripheral e.g. wireless handset 11, in accordance with conventional wireless technology e.g. Bluetooth or Wifi; audio codec module 12 connected to microphones 13 and/or loudspeakers 14, stereo headset connected through jack connector 15, wired handset connected through RJ11 connector 16, handset charging port 17 with associated battery charge limiter 18 and battery charge detection circuit 19, HDMI port 20, and USB host 21 including USB ports e.g. USB type A port 22 and micro-USB port 23 and power limiter 24.

The power supply module 4 comprises the configurable resistor unit (not shown).

CPU 5 is also connected to a memory 25 by memory bus 26, such as DDR-type or eMMC-type memory chips. The memory 25 stores software instructions which may be executed by CPU 5 to carry out different processes related to the operations of the IP telephone 1.

One of those processes relates consist of a power budget monitoring process 27, comprising the steps of:
  determining a total power requirement of the IP telephone 1, taking account of power requirements of all peripherals without an independent power source
  detecting a current resistance state of the configurable resistor unit provided in power supply module 4 and,
  in response to detecting that the power requirement overshoots the current power class, triggering the power class enhancement process as described above.

Such determination may be carried out periodically or upon detection of specific events, e.g. a USB enumeration process. In an illustrative embodiment, the determination is done just after a bus-powered USB device has been plugged into the USB ports of IP telephone 1. The power requirement of the USB device is detected by USB host 21 during the USB enumeration process before granting activation of the USB device. If the power budget corresponding to the current power class of the telephone is too low to operate the USB device, the USB host 21 will not power up the USB device until after the IP telephone has restarted in an upgraded power class, using the processes described above.

There are many other instances in which a power class enhancement may be triggered. In one embodiment, a user is turning up the volume of loudspeakers 14, so that a power consumption of loudspeakers 14 is increasing. At one point, the CPU 5 detects that total power consumption is going to overshoot the currently allocated power class and triggers the power class enhancement procedure.

In another embodiment, a system administrator changes a configuration of the IP telephone 1 to increase a maximum current of the power limiter 24 of USB host 21. This may be done to allow the IP telephone 1 to operate as a battery charger for external devices, e.g. mobile phones or laptop computers. Upon detecting the new current limitation of the power limiter 24, the CPU 5 detects that total power consumption is going to overshoot the currently allocated power class and triggers the power class enhancement procedure.

In a preferred embodiment, in the course of the power class enhancement procedure, the IP telephone informs the user of a needed restart by displaying a notice of the screen 7 before powering off the telephone. The restart may be delayed until CPU 5 receives an authorization signal from the user, e.g. thanks to an "ok" button on the user interface. This is to avoid inadvertent interruptions of service, e.g. during a phone call. For example, in the above described case of a user turning up the loudspeaker volume, a message is displayed on the screen of the telephone when a given level is reached, to inform the user that a restart of the telephone is required beyond that level.

Elements such as the control units could be e.g. hardware means like e.g. an ASIC, or a combination of hardware and software means, e.g. an ASIC and an FPGA, or at least one microprocessor and at least one memory with software modules located therein.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A powered communication device comprising:
   a local area network (LAN) port adapted for coupling a LAN switch and for receiving data and power from the LAN switch,
   a signature circuit comprising a configurable resistor unit coupled to the LAN port and adapted to generate a classification signal designating a power class of the powered communication device to be detected by the LAN switch,
   wherein the configurable resistor unit comprises at least a first resistor and at least one second resistor, wherein the at least one second resistor is mounted in parallel to the first resistor and selectively connectable to the signature circuit through a switch,
   wherein the power class is associated to a resistance state of the configurable resistor unit, an electronic control unit and peripherals coupled to the electronic control unit, and a power module comprising a power converter adapted to supply power to the electronic control unit and to the peripherals in response to receiving power from the LAN port, wherein the power module further comprises a power switch configured to selectively couple the power converter to the LAN port, a sequence control module having an input coupled to the electronic control unit, a first output coupled to the configurable resistor unit and a second output coupled to the power switch,
   wherein the electronic control unit is configured to determine a power requirement of the powered communication device, detect a current resistance state of the configurable resistor unit and, in response to detecting that the power requirement overshoots a power class associated to the current resistance state of the configurable resistor unit send a single trigger signal to the input of the sequence control module,
   wherein the sequence control module comprises a first delay line arranged between the input and the first output and a second delay line arranged between the input and the second output, so that the single trigger signal received by the input is transmitted to the configurable resistor unit with a first delay to cause reconfiguration of the configurable resistor unit to designate a higher power class, and to the power switch with a second delay to cause the LAN port to be transitorily put in a low-current state to be detected by the LAN switch, and
   wherein the second delay is longer than the first delay.

2. The powered communication device in accordance with claim 1, further comprising a power port adapted for coupling a power adapter and for receiving power from the power adapter,
   wherein the power switch comprises a first switching state for powering the power converter from the LAN port and a second switching state for powering the power converter from the power port, and
   wherein the sequence control module causes the LAN port to be put in a low-current state by sending a trigger signal on its second output to force the power switch in the second switching state.

3. The powered communication device in accordance with claim 2, wherein the power module further comprises a power switch controller adapted to control the power switch, wherein the power switch controller is configured to force the power switch in the second switching state in response to receiving the trigger signal from the sequence control module.

4. The powered communication device in accordance with claim 3, wherein the power switch controller is further configured to force the power switch in the second switching state in response to detecting power on the power port.

5. The powered communication device in accordance with claim 1, wherein the switch is not a steady state switch.

6. The powered communication device in accordance with claim 5, wherein the second delay line comprises a capacitor adapted to store energy for maintaining the first output of the sequence control module in an energized state after the powered communication device has been powered off.

7. The powered communication device in accordance with claim 6, wherein the capacitor is adapted to store energy for maintaining the first output of the sequence control module in an energized state for 2 to 10 minutes.

8. The powered communication device in accordance with claim 1, wherein the electronic control unit further comprises a memory for storing logical identification of a current power class of the powered communication device, wherein the electronic control unit is configured to send a second trigger signal to the input of the sequence control module in response to determining that the current power class is higher than a default power class.

9. The powered communication device in accordance with claim 1, further comprising a USB host adapted to carry out a USB enumeration and configuration process, wherein the electronic control unit is configured to determine a power requirement of the powered communication device as a function of a peripheral power requirement detected during the USB enumeration and configuration process.

10. A communication system comprising:
a powered communication device comprising:
a local area network (LAN) port adapted for coupling a LAN switch and for receiving data and power from the LAN switch,
a signature circuit comprising a configurable resistor unit coupled to the LAN port and adapted to generate a classification signal designating a power class of the powered communication device to be detected by the LAN switch,
wherein the configurable resistor unit comprises at least a first resistor and at least one second resistor, wherein the at least one second resistor is mounted in parallel to the first resistor and selectively connectable to the signature circuit through a switch,
wherein the power class is associated to a resistance state of the configurable resistor unit, an electronic control unit and peripherals coupled to the electronic control unit, and a power module comprising a power converter adapted to supply power to the electronic control unit and to the peripherals in response to receiving power from the LAN port, wherein the power module further comprises a power switch configured to selectively couple the power converter to the LAN port, a sequence control module having an input coupled to the electronic control unit, a first output coupled to the configurable resistor unit and a second output coupled to the power switch,
wherein the electronic control unit is configured to determine a power requirement of the powered communication device, detect a current resistance state of the configurable resistor unit and, in response to detecting that the power requirement overshoots a power class associated to the current resistance state of the configurable resistor unit send a single trigger signal to the input of the sequence control module,
wherein the sequence control module comprises a first delay line arranged between the input and the first output and a second delay line arranged between the input and the second output, so that the single trigger signal received by the input is transmitted to the configurable resistor unit with a first delay to cause reconfiguration of the configurable resistor unit to designate a higher power class, and to the power switch with a second delay to cause the LAN port to be transitorily put in a low-current state to be detected by the LAN switch, and
wherein the second delay is longer than the first delay; and
a LAN switch comprising:
a LAN port adapted for supplying data and power to the LAN port of the powered communication device,
wherein the LAN switch is configured to: detect the powered communication device upon connection of the LAN port of the LAN switch to the LAN port of the powered communication device, determine a power class of the powered communication device as a function of the classification signal generated by the powered communication device, and supply power of a quantity based on the power class of the powered communication device.

11. The communication system in accordance with claim 10, further comprising a power port adapted for coupling a power adapter and for receiving power from the power adapter,
wherein the power switch comprises a first switching state for powering the power converter from the LAN port and a second switching state for powering the power converter from the power port, and
wherein the sequence control module causes the LAN port to be put in a low-current state by sending a trigger signal on its second output to force the power switch in the second switching state.

12. The communication system in accordance with claim 11, wherein the power module further comprises a power switch controller adapted to control the power switch, wherein the power switch controller is configured to force the power switch in the second switching state in response to receiving the trigger signal from the sequence control module.

13. The communication system in accordance with claim 12, wherein the power switch controller is further configured to force the power switch in the second switching state in response to detecting power on the power port.

14. The communication system in accordance with claim 10, wherein the switch is not a steady state switch.

15. The communication system in accordance with claim 14, wherein the second delay line comprises a capacitor adapted to store energy for maintaining the first output of the sequence control module in an energized state after the powered communication device has been powered off.

16. The communication system in accordance with claim 15, wherein the capacitor is adapted to store energy for maintaining the first output of the sequence control module in an energized state for 2 to 10 minutes.

17. The communication system in accordance with claim 10, wherein the electronic control unit further comprises a memory for storing logical identification of a current power class of the powered communication device, wherein the electronic control unit is configured to send a second trigger signal to the input of the sequence control module in response to determining that the current power class is higher than a default power class.

18. The communication system in accordance with claim 10, further comprising a USB host adapted to carry out a USB enumeration and configuration process, wherein the electronic control unit is configured to determine a power requirement of the powered communication device as a function of a peripheral power requirement detected during the USB enumeration and configuration process.

* * * * *